US010870910B2

(12) United States Patent
Holly et al.

(10) Patent No.: US 10,870,910 B2
(45) Date of Patent: Dec. 22, 2020

(54) FERRITIC NITROCARBURIZED PART AND METHODS OF MAKING AND USING THE SAME

(71) Applicants: GM Global Technology Operations LLC, Detroit, MI (US); Woodworth Inc., Pontiac, MI (US)

(72) Inventors: Michael L. Holly, St. Clair Shores, MI (US); Dennis Deciechi, China, MI (US); James J. Gentile, Clinton Township, MI (US); David M. Cummings, Farmington Hills, MI (US); Charles M. Enloe, Grosse Pointe Woods, MI (US)

(73) Assignees: GM Global Technology Operations LLC, Detroit, MI (US); Woodworth Inc., Pontiac, MI (US)

( * ) Notice: Subject to any disclaimer, the term of this patent is extended or adjusted under 35 U.S.C. 154(b) by 113 days.

(21) Appl. No.: 15/866,814

(22) Filed: Jan. 10, 2018

(65) Prior Publication Data

US 2019/0211435 A1    Jul. 11, 2019

(51) Int. Cl.
| | | |
|---|---|---|
| *C23C 8/28* | (2006.01) | |
| *C23C 8/38* | (2006.01) | |
| *C23C 8/32* | (2006.01) | |
| *B62D 29/00* | (2006.01) | |
| *C23C 8/02* | (2006.01) | |

(52) U.S. Cl.
CPC ............. *C23C 8/28* (2013.01); *B62D 29/007* (2013.01); *C23C 8/02* (2013.01); *C23C 8/32* (2013.01); *C23C 8/38* (2013.01)

(58) Field of Classification Search
CPC .... C23C 8/28; C23C 8/42; C23C 8/56; C23C 8/26; C23C 8/32
See application file for complete search history.

(56) References Cited

U.S. PATENT DOCUMENTS

| | | | | |
|---|---|---|---|---|
| 5,753,052 A | * | 5/1998 | Dajoux ...................... | C23C 8/50 148/217 |
| 8,287,667 B2 | * | 10/2012 | Holly ...................... | C21D 1/607 148/217 |
| 9,581,211 B2 | * | 2/2017 | Holly ........................ | C23C 8/04 |
| 2013/0000787 A1 | | 1/2013 | Holly et al. | |
| 2014/0027022 A1 | * | 1/2014 | Yokoi ..................... | C22C 38/28 148/504 |

FOREIGN PATENT DOCUMENTS

CN          102239273 A     11/2011

OTHER PUBLICATIONS

Hoppe, Steffen. "Fundamentals and applications of the combination of plasma nitrocarburizing and oxidizing." Surface and Coatings Technology 98.1-3 (1998): 1199-1204.*

* cited by examiner

*Primary Examiner* — Jessee R Roe
(74) *Attorney, Agent, or Firm* — Quinn IP Law

(57) ABSTRACT

A number of variations may include a ferritic nitrocarburized part comprising steel, wherein the ferritic nitrocarburized steel has a tensile strength exceeding the parent steel material and sufficient ductility, bendability, and flangeability to support subsequent flanging and press-fitting of bushings. Exact strength increases and bendability will be dependent on exact process and alloy combinations.

17 Claims, 3 Drawing Sheets

FERRITIC NITROCARBURIZED PART AND METHODS OF MAKING AND USING THE SAME

TECHNICAL FIELD

The field to which the disclosure generally relates to includes parts and methods of manufacture and use thereof.

BACKGROUND

Currently some vehicle parts may undergo ferritic nitrocarburization.

SUMMARY OF ILLUSTRATIVE VARIATIONS OF THE INVENTION

One variation of the invention shows a product comprising: a ferritic nitrocarburized part comprising steel wherein the ferritic nitrocarburized steel has a tensile strength exceeding the parent steel material and sufficient ductility, bendability, and flangeability to support subsequent flanging and press-fitting of bushings. The optimization of the thermal schedule including sub-critical annealing before nitrocarburizing and steel alloy selection is critical to the maintenance of sufficient mechanical manufacturability, and vanadium content of the selected alloy must be limited to the greatest degree possible. The associated benefits to corrosion and stone impact resistance due to ferritic nitrocarburizing are maintained, and commonly applied anti-chip coatings are no longer required to maintain part mechanical and corrosion performance. Exact strength increases and associated bendability will be dependent on exact process and alloy combinations, but illustrative examples are given subsequently.

Another variation of the invention shows a method comprising: providing a part comprising steel; optionally preheating the part to 400° C.-500° C. for about 2-4 hours; subcritically annealing the part to about 500° C.-725° C. for about 1-5 hours; cooling the part to about 350° C.-500° C.; heating the part to about 500° C.-650° C.; thereafter ferritic nitrocarburizing the part at 500° C.-650° C. to form an iron nitride layer on a surface of the part; and cooling the part to provide a ferritic nitrocarburized part comprising steel wherein the ferritic nitrocarburized steel has increased yield and tensile strength relative to the steel prior to nitrocarburizing. Additionally, bendability and flangeability are maintained for subsequent manufacture, and corrosion and impact resistance of the nitrocarburized steel are maintained.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
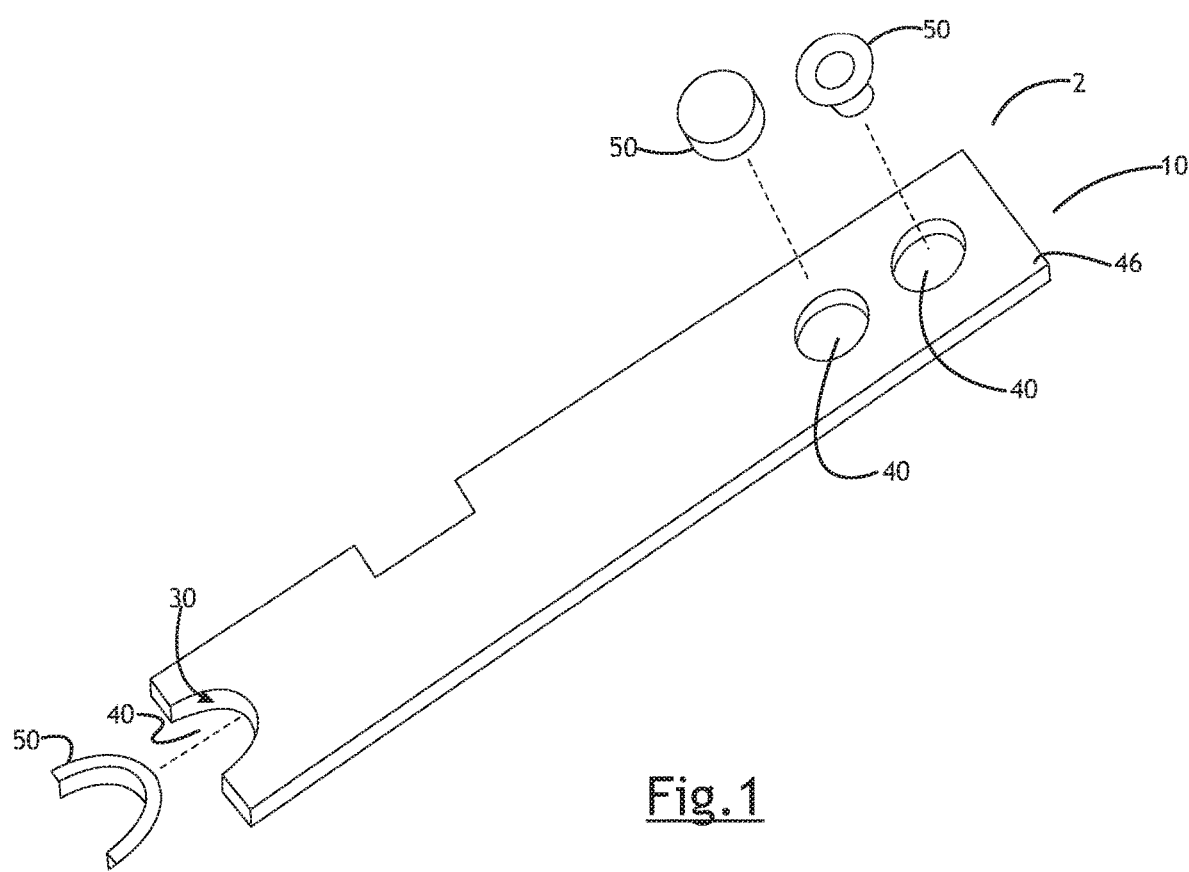
FIG. 1 is a perspective view of a nitrocarburized parts made according to a number of variations.

In a number of variations, the ferritic nitrocarburized part 2 may be a component of a vehicle, for example, as illustrated in FIG. 1. In a number of variations, the ferritic nitrocarburized part 2 may include a surface 46. In a number of variations, the surface 46 may be an outer surface 46. In a number of variations, the vehicle 10 may include a motor vehicle, watercraft, spacecraft, aircraft, or may be another type. In a number of variations, the ferritic nitrocarburized part 2 may be a structural part in the vehicle. In a number of variations, the ferritic nitrocarburized part 2 may be bumper, cowl screen, front clip, pillar, quarter panel, door, trunk, trim piece, rim, rocker, roll cage, strut tower apron, frame, chassis, control arm, trailing link, roof rail, cross rail, roof console, anti-intrusion beam, dashboard beam, strut brace, engine cover, radiator bean, engine mount, longitudinal beam, seat track, under body space frame, toe link, running board, tailgate frame, roof rail, rear back assembly, shelf panel assembly, cowl assembly, door striker assembly, deck trough, strut tower assembly, suspension crossmember, frame rail, c-shape or c-channel rail, hat frame, boxed frame, backbone tube, x-frame, perimeter frame, ladder frame, platform frame, space frame, subframe, backbone chassis, any car structural component including but not limited to a rod, beam, strut, compression member, tie, tie rod, eyebar, spring, guide-wire, suspension cable, wire rope, membrane, shell, shear panel, torsion member, axial member, shear member, or may be another type.

Referring to FIG. 1, the ferritic nitrocarburized part 2 may include a surface 46. In a number of variations, the surface 46 may be a friction surface 46. In a number of variations, the ferritic nitrocarburized part 2 may be machined to form at least one hole 40 within the ferritic nitrocarburized part 2. In a number of variations, the hole 40 may be defined as an opening within or on the side of the ferritic nitrocarburized part 2. In a number of variations, the hole 40 may be circular, polygonal, half circular, u-shaped, or may be another type. In a number of variations, the hole 40 may be punched, machine routed, or may be formed another way. In a number of variations, at least one insert 50 may be positioned into contact with the hole 40. In a number of variations, the insert 50 may attach the ferritic nitrocarburized part 2 to other components, braces, or compartments in a vehicle, or may be used another way. In a number of variations, the insert 50 may act as a galvanic corrosion isolator to a body attachment point or a fastener to a body attachment point and allow for attachment of the ferritic nitrocarburized part 2 to other parts within the vehicle body or chassis. In a number of variations, the insert 50 may be any shape including, but not limited to, a circle, a parabola, a half circle, an ellipse, a polygon, a triangle, or may be another shape. In a number of variations, the insert 50 may comprise prongs. In a number of variations, the term prong may be defined as a projection of the insert 50 in the direction of a different plane from the rest of the insert 50. In a number of variations, the insert 50 may be comprised of a metal, polymer, textile, or may be another type. In a number of variations, the insert 50 may be metal in the form of an element, compound, or alloy. In a number of variations, the insert 50 metal may comprise titanium, steel, cast iron, alloy steel, stainless steel, platinum, palladium, aluminum, copper, nickel, iron, lead, tin, cobalt, bronze, or may be another type. In a number of variations, the insert 50 may comprise a textile comprising an animal textile, a plant textile, a mineral textile, or a synthetic textile. In a number of variations, the insert 50 may comprise a composite material including, but not limited to, a fiber-reinforced polymer, a thermoplastic composite, a metal matrix composite, a ceramic matrix composite, an organic matrix composite, a fiber-reinforced composite, a polyester, a vinyl ester, an epoxy, a phenolic polymer, a polyimide polymer, a polyamide polymer, a polypropylene, PEEK, or may be another type. In a number of variations, the insert 50 may be pre-machined through a stamp and roll or may be machined another way. In a number of variations, the insert 50 may be a bearing including a plain bearing, rolling-element bearing, jewel bearing, fluid bearing, magnetic bearing, flexure bearing, or may be another type. In a number of variations, the insert 50 may be a plain bearing and may be an integral type, bushing type, two-piece type, or may be another type.

Still referring to FIG. 1, in a number of variations, a bonding agent 30 may be held in contact with the ferritic nitrocarburized part 2 or insert 50. This contact may result in adherence or bonding between the bonding agent 30, ferritic nitrocarburized part 2, or insert 50, or any combination thereof. In a number of variations, the bonding agent 30 may include urethane resin, vinylester resin, polyester resin, epoxy resin, phenolic resin, modified phenolic resin or may be another type. In a number of variations, the bonding agent 30 may be reactive or non-reactive.

Figure 2A:
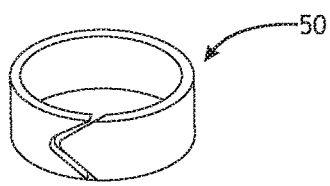
FIG. 2A is a perspective view of a nitrocarburized parts made according to a number of variations.
Figure 2B:
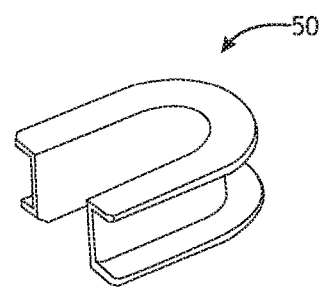
FIG. 2B is a perspective view of a nitrocarburized parts made according to a number of variations.
Figure 2C:
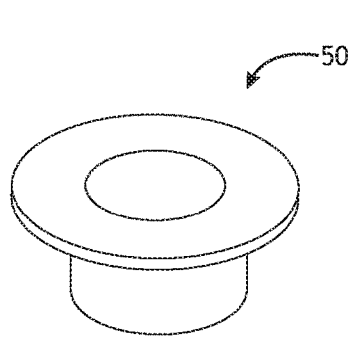
FIG. 2C is a perspective view of a nitrocarburized parts made according to a number of variations.
Figure 2D:
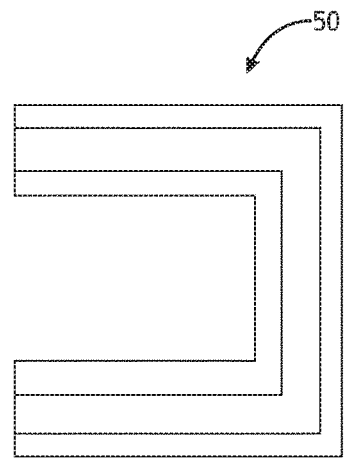
FIG. 2D is a perspective view of a nitrocarburized parts made according to a number of variations.

Referring to FIGS. 2A-2D, in a number of variations, the insert 50 may comprise a different shape. Referring to FIG. 2A, in a number of variations, the insert 50 may comprise a split ring shape. The split shape may be any pattern. Referring to FIG. 2B, in a number of variations, the insert 50 may comprise a U-shape. The insert 50 may comprise prongs on both or one side of the U or may comprise prongs anywhere on the insert 50. Referring to FIG. 2C, in a number of variations, the insert 50 may comprise a cylinder. The insert 50 may comprise a prong on a side or top of the cylinder or may comprise prongs anywhere on the insert 50. Referring to FIG. 2D, in a number of variations, the insert 50 may comprise a square C-shape. In a number of variations, the insert 50 may comprise a prong on a side or top of the cylinder or may comprise prongs anywhere on the insert 50. In a number of variations, the insert 50 may contain serrations or knearling for attachment to another part of the vehicle (which may or may not be a different ferritic nitrocarburized part 2) or to an attachment (not shown). In a number of variations, the insert 50 may contain an adhesive for attachment to either the torsional member or to an attachment (not shown). In a number of variations, an attachment may be defined as anything to which a vehicle part may attach to. In a number of variations, the adhesive may be a metal epoxy, resin, silicone, polyurethane, polysifide, cyanoacrylate, UV-cure, or may be another type.

In a number of variations, the ferritic nitrocarburized part 2 may be made of a steel, carbon steel, high strength low alloy steel, microalloyed steel or another similar functioning alloy. Carbon (C), manganese (Mn), silicon (Si), and microalloy additions of niobium (Nb), titanium (Ti), and vanadium (V) are controlled with limits on residual element concentrations according to general industry and/or individual customer specifications. Carbon is generally limited below 0.15 wt %, manganese is typically limited below 2.0 wt %, silicon is generally limited below 1.0 wt %, and microalloy additions are limited below 0.2 wt %. Additionally, vanadium is limited to its residual concentration (less than 0.01 wt %) and shall not be purposefully included in the alloy design for subsequent ferritic nitrocarburizing according to the outlined method. In a number of variations, the steel may be hot rolled or cold rolled, and yield strengths of the parent steel (prior to ferritic nitrocarburizing) will generally be limited to less than 1000 MPa. It may be understood that the ferritic nitrocarburized part 2 may be cast, stamped, forged, formed from powdered metal or any suitable forming process.

Figure 3:
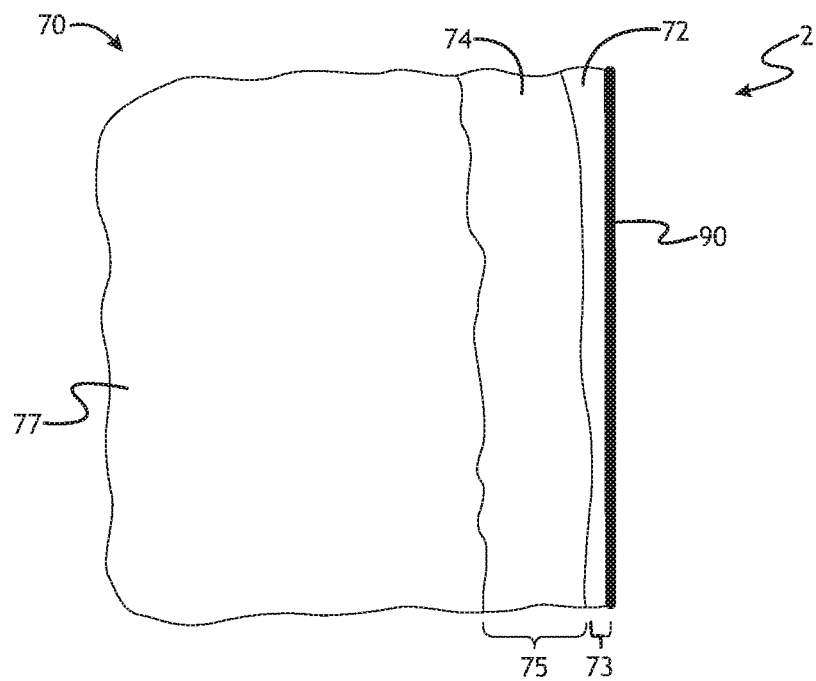
FIG. 3 is an illustration of a partial, sectional view of a nitrocarburized parts made according to a number of variations.

In a number of variations, ferritic nitrocarburization (FNC) has been used to produce the ferritic nitrocarburized part 2 that may be case hardened and resistant to corrosion and wear. In a number of variations, ferritic nitrocarburization may be done on the insert 50. Ferritic nitrocarburization may be used to dispose a compound zone 70 on the ferritic nitrocarburized part 2, as shown in FIG. 3. In a number of variations, the process may involve nitrocarburization of carbon steel parts. In a number of variations, the ferritic nitrocarburized part 2 may be pre-heated in air and then immersed in a molten nitrocarburizing salt bath (or subjected to heating by gas, plasma, fluidized bed, or other atmosphere or process) at an elevated, subcritical temperature for a predetermined time. Next, the ferritic nitrocarburized part 2 may be removed and directly immersed in an oxidizing salt bath at a moderately lower temperature than the nitrocarburizing salt bath for a second dwell time. Next, the ferritic nitrocarburized part 2 may be removed and further cooled to room temperature using water application or slow cooling in air. This compound zone 70 may be an outer portion of ferrous material formed initially through reaction between the iron of the ferrous material and nitrogen and carbon species that may be present in the nitrocarburizing salt bath. Variations of ferritic nitrocarburization can be found in U.S. Patent App. Publication No. 2013/0000787A1. In other variations, the nitrocarburized vehicle components 2, 2', 2" may be ferritic nitrocarburized through a gas nitrocarburization process, a plasma nitrocarburization process, a salt bath nitrocarburization process, a fluidized bed nitrocarburization process, or may be done another way. The compound zone 70 may comprise an iron nitride layer 74 comprising epsilon iron nitride, $Fe_{2-3}N$ and a smaller volume of gamma prime iron nitride $Fe_4N$ formed from the nitrocarburizing salt bath, gas process or other process as well as a surface oxide layer 72 may be formed during immersion into the oxidizing salt bath or in another oxidizing atmosphere or environment, wherein the oxide layer 72 may be comprised of oxidized nitrocarburized iron, $Fe_3O_4$. In a number of variations, the compound zone 70 may have a thickness ranging from 5 to 30 microns, and the oxide layer 72 may have a thickness ranging from 10 to 50% of compound zone. A diffusion layer 77 may be subjacent the iron nitride layer 74 and may be a transition between the iron nitride layer 74 and a portion of the rotational member that may be beyond the reach of ferritic nitrocarburization. The iron nitride layer 74 may have a low coefficient of friction. The concentration of nitrogen in the diffusion layer 77 may be less than the concentration of nitrogen in the iron nitride layer 74 of the compound zone 70 below the oxide layer 72. The oxide layer 72 may have a higher porosity than the iron nitride layer 74.

In a number of variations, the iron nitride layer 74 may have a depth of at least 10 microns. In a number of variations, the nitride layer 74 may have a maximum porosity of about 70%. In a number of variations, the ferritic nitrocarburized steel may have a uniaxial tension and bending performance as indicated by Table 5.

Figure 4:
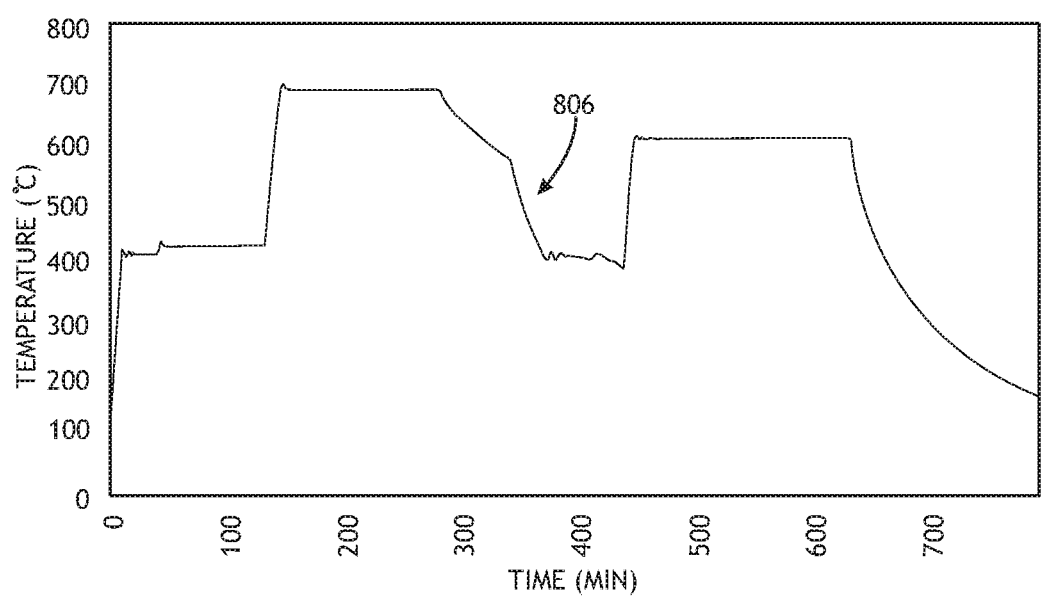
FIG. 4 is a graph of the temperature over time of a method of subjecting a part to sub-critical annealing before part undergoes ferritic nitrocarburizing.

A method 800 is shown according to a number of variations. In a number of variations, in step 802, a part 2 is provided. In a number of variations, the part 2 may comprise a steel or carbon steel. In a number of variations, the method 800 may include, in step 804, of optionally preheating the part 2 to about 400° C.-500° C. for about 2-4 hours. In a number of variations, the method 800 may include, in step 806, sub-critically annealing the part 2 to about 500° C.-725° C. for about 1-5 hours. In a number of variations, the method 800 may include, in step 808, cooling the part 2 to about 350° C.-500° C. In a number of variations, the method 800 may include, in step 810, heating the part 2 to about 500° C.-650° C. In a number of variations, the method 800 may include, in step 812, ferritic nitrocarburizing the part 2 at 500° C.-650° C. to form an iron nitride layer 74 on a surface of the part 2. In a number of variations, the method 800 may include, in step 814, cooling the part to provide a ferritic nitrocarburized part comprising steel, wherein the ferritic nitrocarburized steel has a relative increase in tensile and compressive strength due to heat treatment without a catastrophic loss in ductility and bendability and corrosion, fatigue, and impact resistance improvements. In a number of variations, step 812 of the ferritic nitrocarburizing the part 2 step may include forming compound zone 70 and a surface at an outer edge of the compound zone, wherein the surface 46 is configured for engagement with a corresponding friction material, and wherein the compound zone 70 comprises a nitride layer 74 comprising epsilon iron nitride, $Fe_{2-3}N$ and gamma prime iron nitride $Fe_4N$. In a number of variations, the nitride layer 74 comprises a surface that comprises the outer surface 46. In a number of variations, step 812 of the ferritic nitrocarburizing the part 2 step or step 814 of cooling the part provide a ferritic nitrocarburized part comprising steel, wherein the ferritic nitrocarburized steel has a relative increase in tensile and compressive strength due to heat treatment without a catastrophic loss in ductility and bendability and corrosion, fatigue, and impact resistance improvements. The part may include forming an oxide layer 72 in the compound zone overlying the nitride layer, wherein the oxide layer 72 comprises a surface that comprises the outer surface 46. In a number of variations, step 812 of the ferritic nitrocarburizing the part 2 step or step 814 of cooling the part provide a ferritic nitrocarburized part comprising steel, wherein the ferritic nitrocarburized steel has a tensile strength exceeding the parent steel material and sufficient ductility, bendability, and flangeability to support subsequent flanging and press-fitting of bushings and may include heat treatment of the part 2 in an atmosphere rich in nitrogen and carbon in a mixture. In a number of variations, a temperature profile of the method 800 as a function of time is illustrated in FIG. 4. In a number of variations, the temperature profile may show the step 806 of subcritically annealing the part to about 690° C. for about 2.5 hours, followed by a decrease in the temperature as shown from point X to point Y in the temperature profile. The term "subcritical" refers to annealing of the steel below the Ac1 transformation temperature implying that the steel remains ferritic without the onset of transformation to austenite during the annealing process. In a number of variations, the step 812 of ferritic nitrocarburizing the part 2 after the step 806 of the subcritical anneal of the part 2 may provide a part with improved ductility and higher fatigue resistance as indicated by FIG. 4 with the same benefits provided by FNC of higher strength and corrosion resistance of the part at reduced mass.

Table 5 shows data from uniaxial tension tests demonstrating strength improvements of ferritic nitrocarburized steel in comparison to the parent high strength low alloy (HSLA) steel. The following properties illustrate changes in standard uniaxial tensile properties following subcritical anneal (SCA) ferritic nitrocarburizing (FNC) heat treatment of properly alloyed (no vanadium) cold rolled 340 HSLA Steel (GMW3032M-ST-S-CR340LA-Uncoated-U by General Motors specification). Testing was performed according to ASTM E8. Included are yield strength (YS), ultimate tensile strength (UTS), and percentage elongation.

TABLE 5

| | | As Received 340 HSLA CR | | | After FNC with SCA | | |
|---|---|---|---|---|---|---|---|
| Sample ID | Material | UTS (MPa) | YS (MPa) | Elong. (%) | UTS (MPa) | YS (MPa) | Elong. (%) |
| Sample 1 | 340 HSLA Cold Rolled | 497 | 362 | 29 | 669 | 569 | 22 |
| Sample 2 | 340 HSLA Cold Rolled | 489 | 355 | 29 | 666 | 569 | 22 |
| Sample 3 | 340 HSLA Cold Rolled | 493 | 359 | 28 | 669 | 566 | 22 |

Table 6 shows data from three point bend tests demonstrating strength and bendability improvements of ferritic nitrocarburized parts with an optimized thermal process including sub-critical annealing before nitrocarburizing (ref. FIG. 4) and alloy selection in comparison to the non-optimized process/alloy combinations. Table 6a (Table): HT A→Standard FNC, HT B→FNC with subcritical anneal (Ref. FIG. 4). Alloys identified by microalloy additions in Sample ID. Combinations of HT B and microalloy additions excluding vanadium show improved bendability. Testing was performed according to VDA238-100. Highlighted properties indicate properly selected alloy/treatment combinations.

TABLE 6a

FNC Bend Test Data

| Sample I. D. | Width mm | Thickness mm | Peak Load N | Deflection at Peak Load mm |
|---|---|---|---|---|
| Nb/Ti-added, HT A | 50.48 | 2.51 | 5386.842 | 2.469 |
| Nb/Ti-added, HT A | 50.63 | 2.58 | 5565.717 | 2.34 |

TABLE 6a-continued

FNC Bend Test Data

| Sample I. D. | Width mm | Thickness mm | Peak Load N | Deflection at Peak Load mm |
|---|---|---|---|---|
| Nb/Ti-added, HT A | 50.54 | 2.56 | 5729.447 | 2.876 |
| Nb/Ti-added, HT A | 50.6 | 2.55 | 5241.7824 | 2.19 |
| Nb/Ti-added, HT A | 50.6 | 2.55 | 5254.6823 | 2.042 |
| Nb/Ti-added, HT A | 50.6 | 2.55 | 5220.431 | 2.127 |
| Nb/Ti-added, HT B | 50.52 | 2.55 | 6476.882 | 15.275 |
| Nb/Ti-added, HT B | 50.64 | 2.5 | 6311.768 | 10.143 |
| Nb/Ti-added, HT B | 50.63 | 2.51 | 6030.7 | 10.034 |
| Nb/Ti-added, HT B | 50.6 | 2.5 | 6133.6336 | 9.845 |
| Nb/Ti-added, HT B | 50.6 | 2.5 | 5869.4263 | 14.087 |
| Nb/Ti-added, HT B | 50.6 | 2.5 | 6290.6727 | 13.056 |
| Nb/V-added, HT A | 50.52 | 2.52 | 4960.76 | 1.753 |
| Nb/V-added, HT A | 50.6 | 2.54 | 4581.857 | 1.707 |
| Nb/V-added, HT A | 50.55 | 2.5 | 4884.275 | 1.717 |
| Nb/V-added, HT A | 50.6 | 2.5 | 4881.0318 | 1.744 |
| Nb/V-added, HT A | 50.6 | 2.5 | 4923.2899 | 1.78 |
| Nb/V-added, HT A | 50.6 | 2.5 | 4229.3676 | 1.558 |
| Nb/V-added, HT B | 50.54 | 2.41 | 4417.027 | 1.639 |
| Nb/V-added, HT B | 50.67 | 2.46 | 3658.42 | 1.52 |
| Nb/V-added, HT B | 50.56 | 2.46 | 4048.363 | 1.477 |
| Nb/V-added, HT B | 50.6 | 2.5 | 4323.7854 | 1.572 |
| Nb/V-added, HT B | 50.6 | 2.5 | 4629.7073 | 1.671 |
| Nb/V-added, HT B | 50.6 | 2.5 | 3568.3621 | 1.694 |
| Ti-added, HT A | 50.62 | 2.51 | 4765.543 | 2.16 |
| Ti-added, HT A | 50.37 | 2.52 | 4869.762 | 2.238 |
| Ti-added, HT A | 50.37 | 2.52 | 4836.875 | 2.13 |
| Ti-added, HT A | 50.6 | 2.5 | 4715.1132 | 2.17 |
| Ti-added, HT A | 50.6 | 2.5 | 4456.2268 | 2.026 |
| Ti-added, HT A | 50.6 | 2.5 | 4834.7703 | 2.039 |
| Ti-added, HT B | 50.75 | 2.48 | 6200.815 | 15.79 |
| Ti-added, HT B | 50.99 | 2.46 | 6280.383 | 15.206 |
| Ti-added, HT B | 50.98 | 2.52 | 6274.672 | 14.917 |
| Ti-added, HT B | 50.6 | 2.5 | 6218.6116 | 16.407 |
| Ti-added, HT B | 50.6 | 2.5 | 5774.679 | 14.815 |
| Ti-added, HT B | 50.6 | 2.5 | 5262.244 | 13.608 |

The following table outlines measured steel chemistries for 550LA samples by three point bending according to VDA 238-100. Compositional data are reported in percentage by weight (wt %). Results of three point bend tests are outlined in Table 6a.

TABLE 6b

| Alloy | C | Mn | Si | Nb | Ti | V |
|---|---|---|---|---|---|---|
| Ti-added 550LA | 0.06 | 1.02 | 0.02 | 0.002 | 0.119 | 0.008 |
| Nb/Ti-added 550LA | 0.055 | 1.24 | 0.05 | 0.076 | 0.035 | 0.003 |
| Nb/V-added 550LA | 0.061 | 1.35 | 0.01 | 0.05 | 0.001 | 0.077 |

Numerical data have been presented herein in a range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature from about 550° C. to about 570° C. should be interpreted to include not only the explicitly recited limits of about 550° C. to about 570° C., but also to include individual amounts such as 552° C., 569° C., etc., and sub-ranges such as from about 555° C. to about 560° C., etc. Furthermore, when "about" is utilized to describe a value, this is meant to encompass minor variations (up to +/−10%) from the stated value.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including a ferritic nitrocarburized part comprising steel wherein the ferritic nitrocarburized part has a tensile strength exceeding the parent steel material and sufficient ductility, bendability, and flangeability to support subsequent flanging and press-fitting of bushings.

Variation 2 may include a product as set forth in Variation 1 wherein the ferritic nitrocarburized part comprises a structural component for a vehicle.

Variation 3 may include a product as set forth in any of Variations 1-2, wherein the ferritic nitrocarburized part comprises a compound zone and a surface at an outer edge of the compound zone, wherein the surface is configured for engagement with a corresponding friction material, and wherein the compound zone comprises a nitride layer comprising epsilon iron nitride, $Fe_{2-3}N$ and gamma prime iron nitride $Fe_4N$.

Variation 4 may include a product as set forth in Variation wherein the nitride layer comprises a surface that comprises an outer surface.

Variation 5 may include a product as set forth in Variation 3 wherein compound zone further comprises an iron oxide layer overlying the nitride layer that comprises an outer surface.

Variation 6 may include a product as set forth in Variation 3 wherein the nitride layer has a depth of at least 10 microns.

Variation 7 may include a method including providing a part comprising steel; preheating the part to about 400° C.-500° C. for about 2-4 hours; subcritically annealing the part comprising heating the part to about 500° C.-725° C. for about 1-5 hours and cooling the part to about 350° C.-500° C.; heating the part to about 500° C.-650° C.; ferritic nitrocarburizing the part at about 500° C.-650° C. to form an iron nitride layer on a surface of the part; and cooling the part to provide a ferritic nitrocarburized part comprising steel wherein the ferritic nitrocarburized part has a tensile strength exceeding the parent steel material and sufficient ductility, bendability, and flangeability to support subsequent flanging and press-fitting of bushings.

Variation 8 may include a method as set forth in Variation 9 wherein ferritic nitrocarburizing includes a gas nitrocarburizing process, a plasma nitrocarburizing process, a fluidized bed nitrocarburization process, or a salt bath nitrocarburizing process.

Variation 9 may include a method as set forth in any of Variations 9-10, wherein the ferritic nitrocarburizing the part step comprises forming compound zone and a surface at an outer edge of the compound zone, wherein the surface is configured for engagement with a corresponding friction material, and wherein the compound zone comprises a nitride layer comprising epsilon iron nitride, $Fe_{2-3}N$ and gamma prime iron nitride $Fe_4N$.

Variation 10 may include a method as set forth in any of Variations 9-11 wherein the ferritic nitrocarburized part comprises a structural component for a vehicle.

Variation 11 may include a method as set forth in any of Variation 11-12 wherein the nitride layer comprises a surface that comprises an outer surface.

Variation 12 may include a method as set forth in any of Variations 11-12 wherein the ferritic nitrocarburizing the part step further comprises forming an iron oxide layer in the compound zone overlying the nitride layer wherein the iron oxide layer comprises a surface that comprises an outer surface.

Variation 13 may include a method as set forth in any of Variations 11-14 wherein the nitride layer has a depth of at least 10 microns.

Variation 14 may include a method as set forth in any of Variations 9-17 wherein the ferritic nitrocarburizing the part step comprises heat treatment of the part in an atmosphere rich in nitrogen and carbon in a mixture.

Variation 15 may include a method as set forth in any of Variations 11-18 wherein the iron oxide layer comprises oxidized nitrocarburized iron of the formula $Fe_3O_4$.

The above description of select examples of the invention is merely exemplary in nature and, thus, variations or variants thereof are not to be regarded as a departure from the spirit and scope of the invention.

What is claimed is:

1. A product comprising:
   a ferritic nitrocarburized part including a parent steel material that is subcritically annealed;
   wherein the ferritic nitrocarburized part has a tensile strength exceeding that of the parent steel material, and the ferritic nitrocarburized part has characteristics of ductility, bendability, and flangeability to support subsequent flanging and press-fitting of bushings; and
   wherein the ferritic nitrocarburized part includes a compound zone and a surface at an outer edge of the compound zone, wherein the surface is configured for engagement with a corresponding friction material, and wherein the compound zone includes a nitride layer having epsilon iron nitride, $Fe_{2-3}N$ and gamma prime iron nitride $Fe_4N$.

2. The product as defined in claim 1 wherein the ferritic nitrocarburized part includes a structural component for a vehicle.

3. The product as defined in claim 2 wherein the structural component defines a hole, and further includes an insert disposed in the hole.

4. The product as defined in claim 1 wherein the nitride layer includes an outer surface.

5. The product as defined in claim 1 wherein the compound zone further includes an iron oxide layer overlying the nitride layer, and the iron oxide layer includes an outer surface.

6. The product as defined in claim 1 wherein the nitride layer has a depth of at least 10 microns.

7. A product comprising:
   a parent steel that is cold-rolled and subcritically annealed;
   a compound zone disposed on the parent steel to form a ferritic nitrocarburized part, and the compound zone includes a nitride layer disposed on the parent steel;
   wherein the nitride layer includes epsilon iron nitride, $Fe_{2-3}N$, and gamma prime iron nitride $Fe_4N$; and
   wherein the ferritic nitrocarburized part has a tensile strength that exceeds that of the parent steel.

8. The product as defined in claim 7 wherein the ferritic nitrocarburized part includes a structural component for a vehicle.

9. The product as defined in claim 8 wherein the structural component defines a hole, and further includes an insert disposed in the hole.

10. A method comprising:
    providing a part that includes a parent steel material;
    preheating the part to about 400° C. 500° C. for about 2-4 hours;
    subcritically annealing the part that includes heating that part to about 500° C. 725° C. for about 1-5 hours and cooling the part to about 350° C.-500° C.;
    heating the part to about 500° C.-650° C.;
    ferritic nitrocarburizing the part at about 500° C.-650° C. to form an iron nitride layer on a surface of the part;
    cooling the part to provide a ferritic nitrocarburized part that includes the parent steel material, wherein the ferritic nitrocarburized part has a tensile strength exceeding that of the parent steel material, and the ferritic nitrocarburized part has characteristics of ductility, bendability, and flangeability to support subsequent flanging and press-fitting of bushings; and
    wherein ferritic nitrocarburizing the part includes forming a compound zone and a surface at an outer edge of the compound zone, wherein the surface at the outer edge is configured for engagement with a corresponding friction material, and wherein the compound zone includes a nitride layer having epsilon iron nitride, $Fe_{2-3}N$ and gamma prime iron nitride $Fe_4N$.

11. The method as defined in claim 10 wherein ferritic nitrocarburizing includes a gas nitrocarburizing process, a plasma nitrocarburizing process, a fluidized bed nitrocarburization process, or a salt bath nitrocarburizing process.

12. The method as defined in claim 10 wherein the ferritic nitrocarburized part includes a structural component for a vehicle.

13. The method as defined in claim 10 wherein the nitride layer includes an outer surface.

14. The method as defined in claim 10 wherein ferritic nitrocarburizing the part further includes forming an iron oxide layer in the compound zone overlying the nitride layer, wherein the iron oxide layer includes an outer surface.

15. The method as defined in claim 14 wherein the iron oxide layer includes oxidized nitrocarburized iron having a formula of $Fe_3O_4$.

16. The method as defined in claim 10 wherein the nitride layer has a depth of at least 10 microns.

17. The method as defined in claim 10 wherein ferritic nitrocarburizing the part further includes heat treatment of the part in an atmosphere rich in nitrogen and carbon in a mixture.

* * * * *